(12) United States Patent
Lehnhardt et al.

(10) Patent No.: US 10,552,401 B2
(45) Date of Patent: Feb. 4, 2020

(54) OFFLINE PREPARATION FOR BULK INSERTS

(71) Applicant: COMPUGROUP MEDICAL SE, Koblenz (DE)

(72) Inventors: Jan Lehnhardt, Koblenz (DE); Tobias Rho, Bonn (DE)

(73) Assignee: COMPUGROUP MEDICAL SE, Koblenz (DE)

( * ) Notice: Subject to any disclaimer, the term of this patent is extended or adjusted under 35 U.S.C. 154(b) by 228 days.

(21) Appl. No.: 15/441,377

(22) Filed: Feb. 24, 2017

(65) Prior Publication Data
US 2018/0181607 A1    Jun. 28, 2018

(30) Foreign Application Priority Data

Dec. 23, 2016    (EP) .................................... 16206698

(51) Int. Cl.
*G06F 16/22*    (2019.01)
*G06F 16/23*    (2019.01)
(Continued)

(52) U.S. Cl.
CPC ............ *G06F 16/2282* (2019.01); *G06F 7/08* (2013.01); *G06F 16/211* (2019.01);
(Continued)

(58) Field of Classification Search
CPC . G06F 16/2282; G06F 16/221; G06F 16/2386
See application file for complete search history.

(56) References Cited

U.S. PATENT DOCUMENTS

| 5,994,780 A | 8/1999 | Chase et al. |
|---|---|---|
| 6,148,342 A | 11/2000 | Ho |

(Continued)

FOREIGN PATENT DOCUMENTS

| EP | 1555624 A1 | 7/2005 |
|---|---|---|
| EP | 2731044 A1 | 5/2014 |

(Continued)

OTHER PUBLICATIONS

European Search Report dated Nov. 9, 2015 for EP Application No. EP 13186333, 16 pages.

(Continued)

*Primary Examiner* — Loc Tran
(74) *Attorney, Agent, or Firm* — J. Clinton Wimbish; Nexsen Pruet, PLLC

(57) ABSTRACT

A method includes an algorithm that is adapted for resorting sorted data items in accordance with levels and the ordering of the nodes within each level of a tree data structure, each data item corresponding to a node of the tree data. The items are received at a client computer, and to be stored on the tree data structure. The received data items are sorted in accordance with a predefined sorting order. The algorithm is processed at the client computer for resorting the sorted received data items. A data table is generated for representing the tree data structure in a tabular form having columns and rows, wherein in accordance with the resorting order each row of the data table represents a respective resorted data item, wherein values in the columns are determined in accordance with the order of the rows. The data table is stored as the tree data structure.

14 Claims, 4 Drawing Sheets

(51) Int. Cl.
*G06F 16/21* (2019.01)
*G06F 7/08* (2006.01)

(52) U.S. Cl.
CPC ........ *G06F 16/221* (2019.01); *G06F 16/2246* (2019.01); *G06F 16/2386* (2019.01)

(56) References Cited

U.S. PATENT DOCUMENTS

| | | |
|---|---|---|
| 6,225,546 B1 | 5/2001 | Kraft et al. |
| 6,785,810 B1 | 8/2004 | Lirov et al. |
| 7,058,622 B1 | 6/2006 | Tedesco |
| 7,711,719 B1 | 5/2010 | Waldin et al. |
| 8,429,421 B2 | 4/2013 | Chase et al. |
| 8,626,749 B1 | 1/2014 | Trepetin et al. |
| 8,958,552 B2 | 2/2015 | Hattori et al. |
| 8,990,223 B2 | 3/2015 | Melnychenko et al. |
| 9,234,725 B2 | 1/2016 | Spalka et al. |
| 9,495,555 B2 | 11/2016 | Spalka et al. |
| 9,558,228 B2 | 1/2017 | Spalka et al. |
| 2002/0038421 A1 | 3/2002 | Hamada |
| 2002/0104002 A1 | 8/2002 | Nishizawa et al. |
| 2002/0174355 A1 | 11/2002 | Rajasekaran et al. |
| 2002/0193066 A1 | 12/2002 | Connelly |
| 2004/0181679 A1 | 9/2004 | Dettinger et al. |
| 2005/0144470 A1 | 6/2005 | Takashima et al. |
| 2005/0198017 A1 | 9/2005 | Gaponoff |
| 2006/0236104 A1 | 10/2006 | Wong et al. |
| 2007/0118731 A1 | 5/2007 | Zizzi |
| 2008/0080718 A1 | 4/2008 | Meijer et al. |
| 2008/0086488 A1 | 4/2008 | Nomula et al. |
| 2008/0097954 A1 | 4/2008 | Dutta et al. |
| 2008/0104102 A1 | 5/2008 | Zhang |
| 2008/0270370 A1 | 10/2008 | Catellanos et al. |
| 2009/0210414 A1 | 8/2009 | Shinjo |
| 2010/0266132 A1 | 10/2010 | Bablani et al. |
| 2010/0306221 A1 | 12/2010 | Lokam et al. |
| 2011/0129089 A1 | 6/2011 | Kim et al. |
| 2011/0145593 A1 | 6/2011 | Auradkar et al. |
| 2012/0159180 A1 | 6/2012 | Chase et al. |
| 2012/0297201 A1 | 11/2012 | Matsuda et al. |
| 2013/0067226 A1 | 3/2013 | Kunde et al. |
| 2013/0191650 A1 | 7/2013 | Balakrishnan et al. |
| 2014/0024425 A1 | 1/2014 | Wolff et al. |
| 2014/0337417 A1 | 11/2014 | Park et al. |
| 2015/0006577 A1 | 1/2015 | Vu et al. |
| 2015/0095642 A1 | 4/2015 | Spalka et al. |
| 2015/0106632 A1 | 4/2015 | Karame et al. |
| 2015/0195122 A1 | 7/2015 | Dahlberg et al. |
| 2016/0253367 A1 | 9/2016 | Spalka et al. |
| 2016/0321312 A1 | 11/2016 | Spalka et al. |
| 2016/0371503 A1 | 12/2016 | Spalka et al. |
| 2017/0116405 A1* | 4/2017 | Samzelius ............... G06F 3/023 |
| 2017/0277687 A1* | 9/2017 | Sammis .............. G06F 16/2246 |

FOREIGN PATENT DOCUMENTS

| | | |
|---|---|---|
| EP | 2731045 A1 | 5/2014 |
| EP | 2731046 A1 | 5/2014 |
| WO | 2005077123 A2 | 8/2005 |

OTHER PUBLICATIONS

Non-Final Office Action dated May 11, 2016 for U.S. Appl. No. 14/495,981, 29 pages.
Notice of Allowance dated Sep. 26, 2016 for U.S. Appl. No. 14/495,981, 17 pages.
Non-Final Office Action dated Apr. 11, 2016 for U.S. Appl. No. 14/495,983, 31 pages.
Restriction Requirement dated Feb. 17, 2016 for U.S. Appl. No. 14/495,983, 8 pages.
Final Office Action dated Jul. 29, 2016 for U.S. Appl. No. 14/495,983, 29 pages.
Notice of Allowance dated Mar. 16, 2017 for U.S. Appl. No. 14/495,983, 15 pages.
Non-Final Office Action dated Feb. 9, 2017 for U.S. Appl. No. 15/170,088, 17 pages.
European Search Report dated Mar. 10, 2014 for EP Application No. EP 13186360, 9 pages.
European Search Report dated Mar. 10, 2014 for EP Application No. 13186390, 9 pages.
Office Action dated Nov. 5, 2015 for EP Application No. 13186390, 5 pages.
Notice of Allowance dated Oct. 7, 2015 for U.S. Appl. No. 14/495,984, 14 pages.
Notice of Allowance dated Dec. 16, 2016 for U.S. Appl. No. 14/955,212, 10 pages.
Notice of Allowance dated Mar. 8, 2017 for U.S. Appl. No. 14/955,212, 13 pages.
Al-Sakran, H.O. et al., "Efficient Cryptographic Technique for Securing and Accessing Outsourced Data," International Journal of Computer Science and Information Security,vol. 9, No. 8, Aug. 2011; 6 pages.
Li, Jin et al., "Fuzzy Keyword Search over Encrypted Data in Cloud Computing" INFOCOM, 2010 Proceedings IEEE, IEEE, Piscataway, NJ, USA, (Mar. 14, 2010), ISBN 978-1-4244-5836-3, pp. 1-5.
Song, D. et al., "Practical Techniques for Searches on Encrytpted Data," Proceedings of the 2000 IEEE Symposium on Security and Privacy, May 2000, 12 pages.
Wang, C. et al., "Achieving usable and privacy-assured similarity search over outsourced cloud data," 2012 Proceedings of the IEEE INFOCOM; Mar. 25-30, 2012; DOI 10.1109-INFCOM.2012.6195784; pp. 451-459.
Zhang et al., "A Secure Cipher Index Over Encrypted Character Data in Database," IEEE Proceedings of the 7th International Conference on Machine Learning and Cybernetics, Kunming; Jul. 12-15, 2008; pp. 1111-1116.
European Search Report dated Nov. 6, 2015 for EP Application No. EP 13186330, 16 pages.
Office Action dated Jun. 6, 2017 for EP Application No. EP 13186330, 8 pages.
Restriction Requirement dated Feb. 5, 2016 for U.S. Appl. No. 14/495,980, 7 pages.
Non-Final Office Action dated Apr. 14, 2016 for U.S. Appl. No. 14/495,980, 10 pages.
Notice of Allowance dated Jul. 15, 2016 for U.S. Appl. No. 14/495,980, 10 pages.
Non-Final Office Action dated Oct. 12, 2017 for U.S. Appl. No. 15/286,638, 13 pages.
Non-Final Office Action dated Sep. 28, 2017 for U.S. Appl. No. 15/202,672, 14 pages.
Notice of Allowance dated Sep. 5, 2017 for U.S. Appl. No. 15/170,088, 11 pages.
Final Office Action dated Jan. 29, 2018 for U.S. Appl. No. 15/286,638, 12 pages.
Notice of Allowance dated Apr. 5, 2018 for U.S. Appl. No. 15/286,638, 12 pages.
Final Office Action dated Jan. 29, 2018 for U.S. Appl. No. 15/202,672, 13 pages.
Notice of Allowance dated Apr. 18, 2018 for U.S. Appl. No. 15/202,672, 12 pages.
Office Action dated Jun. 6, 2017 for EP Application No. EP 13186333, 8 pages.
European Search Report dated Jun. 8, 2017 for EP Application No. EP 16206698, 11 pages.
De Couto, Douglas, "One Dimensional Binary Searching," Mar. 17, 1998; XP055375942; retrieved from http://groups.csail.mit.edu/graphics/classes/6.838/S98/meetings/m13/1d-bst.html on May 24, 2017; 4 pages.
Knuth, Donald E., "The Art of Computer Programming, vol. 3: Sorting and Searching, Second Edition;" May 24, 1998; Addison-Wesley Professional; XP55232565, 8 pages.

(56) References Cited

OTHER PUBLICATIONS

Knuth, Donald E., "Sorting and Searching—The Art of Computer Programming;" Jan. 1, 1998; Addison-Wesley; XP002053794; pp. 406-419.

* cited by examiner

```
function treeOrganize(x) {
    x = x.sort();
    intervals.push(0,x.length - 1);
    while (intervals not empty) {
        iv = intervals.shift();
        middle = [(iv.low + iv.high) / 2];
        result.push(x[middle]);
        if (iv.low < middle)  intervals.push(iv.low, middle-1);
        if (middle < iv.high) intervals.push(middle+1, iv.high);
    }
    return result;
}
```

| seq | cData | refParent | refLeft | refRight | sortNumber | isLeft | height |
|---|---|---|---|---|---|---|---|
| 1 | 0xF8E1F149258E53469141016BB44FE404 | | 2 | 3 | 0 | | 5 |
| 2 | 0x8F0115276F32564E81849D9DCB73DB93 | 1 | 4 | 5 | -128 | true | 4 |
| 3 | 0x23C7B0E5136B114F80F52D988BE66144 | 1 | 6 | 7 | 128 | false | 4 |
| 4 | 0xB9EB4F09EC0DA84CA9E9AAF1063DB2D7 | 2 | 8 | 9 | -192 | true | 3 |
| 5 | 0xF2CFB651E21DB4498D61E2654902438B | 2 | 10 | 11 | -64 | false | 3 |
| 6 | 0xAD0B48079F3C8E4985C018589D841D91 | 3 | 12 | 13 | 64 | true | 3 |
| 7 | 0x55F11E3B4E701944B4D38A3726F55EAE | 3 | 14 | 15 | 192 | false | 3 |
| 8 | 0xB9F62417C407B1439B1350F3F94A771C | 4 | 16 | 17 | -224 | true | 2 |
| 9 | 0xA3604D76D45DDA4595E06CC0B830B4CB | 4 | 18 | 19 | -160 | false | 2 |
| 10 | 0xBF5802EFCEA37E45881C6065417688D1 | 5 | 20 | 21 | -96 | true | 2 |
| 11 | 0x4641B6F698B0CD469F2E6947CBB71480 | 5 | 22 | 23 | -32 | false | 2 |
| 12 | 0x94B4736C0AEC7D4C95C4574D966E215F | 6 | 24 | 25 | 32 | true | 2 |
| 13 | 0x7AB232175C1B934794A4B4F4E8865E2D | 6 | 26 | 27 | 96 | false | 2 |
| 14 | 0x8787BA7920F73D45815E6DD23AAFC5CE | 7 | 28 | 29 | 160 | true | 2 |
| 15 | 0xEA6DB039D305E947BD7B398F5C0C327D | 7 | 30 | 31 | 224 | false | 2 |
| 16 | 0x1339ACE93A4A9042BC9B1EB14CCAB9DE | 8 | | | -240 | true | 1 |
| 17 | 0x1EE7E1820984804594300070C47154057 | 8 | | | -208 | false | 1 |
| 18 | 0x95A34199BDB53841A7CF83898CA294C3 | 9 | | | -176 | true | 1 |
| 19 | 0xF513B4629DBE734599DC96CED189AE90 | 9 | | | -144 | false | 1 |
| 20 | 0x03E93710443D154B98C424F18DA6EA86 | 10 | | | -112 | true | 1 |
| 21 | 0x17E89ADF46A68A4B9E85DD30F2CF456B | 10 | | | -80 | false | 1 |
| 22 | 0x08A29A44D15E1740966073C64F548A1D | 11 | | | -48 | true | 1 |
| 23 | 0xA753D426124BA54FA8B2F46250906141 | 11 | | | -16 | false | 1 |
| 24 | 0xED68FA078B1BBA4DB49C437649063A08 | 12 | | | 16 | true | 1 |
| 25 | 0x974E77C583361D468C68D3707C34F3E5 | 12 | | | 48 | false | 1 |
| 26 | 0xAF76EB4D31D97E4EA994CF1877680278 | 13 | | | 80 | true | 1 |
| 27 | 0x9FDA2159F71F8F468119C2573F0D0D71 | 13 | | | 112 | false | 1 |
| 28 | 0x5631F22502B8154A976569B38F2FCF2E | 14 | | | 144 | true | 1 |
| 29 | 0x13F6B019C1248445B6616AAA8521C6E3 | 14 | | | 176 | false | 1 |
| 30 | 0xACFBE386AD6DE746A7100D7FD69FA29A | 15 | | | 208 | true | 1 |
| 31 | 0xB39C7D8EE447BD47B1EBF409D4FFD66D | 15 | | | 240 | false | 1 |

Fig. 5

OFFLINE PREPARATION FOR BULK INSERTS

CROSS REFERENCE TO RELATED APPLICATION(S)

The present application claims priority to European Patent Application No. 16 206 698.9, entitled "Offline Preparation for Bulk Inserts," filed on Dec. 23, 2016, the entirety of which is herein incorporated by reference.

BACKGROUND

The present disclosure relates to database systems. Specifically, the disclosure relates to a method for providing a tree data structure from bulk data items.

Tree data structures are used to quickly locate data without having to search every row in a database table every time a database table is accessed. However, creating tree data structure can be rather time and processing power consuming. In particular, a step-by-step insertion of data items into a tree structure consumes a significant amount of processing power at a server system because the server system has to determine for each item the insert position. Also, this step by step insertion takes a long time and blocks during that long time read operations on the tree data structure since the tree data structure is modified over and over for a long time.

EP2731044 A1 relates to a computer and method which allow performing an interval search on a set of data items stored on a database that underlies a linear order. The interval boundaries can be arbitrarily specified. The data items are encrypted and form a partially ordered set that expresses the data items' linear order. The search interval is specified in a request received at a client system. The client system determines both data items forming the boundaries of the search interval in order to perform the search.

SUMMARY

Various embodiments provide a computer implemented method for providing a tree data structure from sets of data items, a computer system, and a computer program product as described by the subject matter of the independent claims. Advantageous embodiments are described in the dependent claims. Embodiments of the present invention can be freely combined with each other if they are not mutually exclusive.

In one aspect, the invention relates to a method for providing a tree data structure from bulk data, the bulk data comprising data items. The method comprises:
providing an algorithm adapted for resorting sorted data items in accordance with levels and the ordering of nodes within each level of a tree data structure, each data item corresponding to a node of the tree data structure;
receiving at a client computer the data items to be stored on the tree data structure;
sorting the received data items in accordance with a predefined sorting order;
processing at the client computer the algorithm for resorting the sorted received data items;
generating a data table for representing the tree data structure in a tabular form having columns and rows, wherein in accordance with the resorting order each row of the data table represents a respective resorted data item, wherein values in the columns are determined in accordance with the order of the rows;
storing the data table as the tree data structure.

The data table therefore represents a partially ordered set of data items. A partially ordered set consists of a set together with a binary relation that indicates that, for certain pairs of elements in the set, one of the elements precedes the other. Such a relation is called a partial order to reflect the fact that not every pair of elements need be related: for some pairs, it may be that neither element precedes the other in the partial ordered set. Nevertheless, the partially ordered set expresses the entire linear order over all of its data items.

The predefined sorting order is for example a lexicographic sorting order. The tree data structure is an ordered tree. Thus, the resorting is performed in such a manner that the order of the nodes (i.e. the data items) in the tree is reflecting the predefined sorting order. Thus, by means of the resorting the sorted data items are mapped onto the partial order. The result is a data table describing an ordered tree via the order in which the data items are listed in the table, as well as the indications of the edges of each node, as far as available (e.g. leaf nodes have only a single edge to their parent nodes).

In accordance with an embodiment of the invention, the data items are stored encrypted with a cryptographic key in the data table, wherein the data items form the partially ordered set, the partial order being formed with respect to the data items in non-encrypted form.

In accordance with an embodiment of the invention the data items are tuples or attribute values of an attribute. The above-described procedure can thus be applied either for tuples as a whole, or parts of tuples or to individual attribute values. It has to be noted here, that the description is not limited to single values of an attribute. An attribute may also comprise multiple elements like for example multiple numbers separated from each other by for example, commas, semicolons or even multiple Boolean operators.

Thus, the term "data item" as used herein refers to e.g. a data value of a data element of a set of elements like for example a tuple that comprises one or more data elements, such as a data value of a data field of a data record that has multiple data fields, within a database, such as a relational database, object oriented databases, object relational databases, hierarchical databases, noSQL databases, or in-memory database. For example, a medical data record of a patient may comprise various data elements, e.g. data fields, such as name, address, telephone number and medical data fields of that patient where data values for name, address and telephone number are exemplary data items. A data item may comprise a string of characters that may comprise a plurality of letters, numbers, or both. The data item may comprise, in another example, a number having integer value or float value etc.

The bulk data comprise data items to be inserted in bulk or in group. The bulk of data items comprise the received data items. The server system may comprise or have access to a patient database. The patient database comprises data of patients. For example, each patient may be associated with one or more records. The one or more records may comprise detailed data on a respective patient. The one or more records may be associated with a given patient using a patient identifier. The patient identifier may for example be a unique identifier. The patient identifier may for example comprise at least part of the name of the patient. The received data items may comprise the patient identifiers.

The term "user" may refer to an entity e.g., an individual, a computer, or an application executing on a computer that issues requests to insert data items or performing a database search.

The present method may enable an efficient insert of large amounts of data in a tree data structure e.g. using one or more block-by-block operations for bulk data insertion. For example, the present method may particularly be advantageous in case a doctor may migrate his/her patients' data from an old system to a new system in an optimal manner using the present method.

The present method may avoid an incremental step by step copying of data items into a remote database (server) system and thus may reduce above all execution time, but also data traffic and utilization of the network that connects the client system and the sever system. The step by step copying of data items refers to the copying of the data items one by one. The present method may make use of the patterns of the tree data structure (e.g. binary tree) in order to compute the database relation content of the tree data structure beforehand and to insert the content in blocks into the database.

Generating the data table as a whole from the bulk data may save processing time that would otherwise be required for sending the items one by one to the server for storage, wherein the server would then determine individually for each received data item the correct position in the tree data structure where the data item is to be stored in a relation and then performs the storing.

An approach that is suitable especially for data items that are to be stored encrypted in a relation of a database, is that for storage of an encrypted desired data item, the client is traversing, starting from an initial data item of the data items at the database, the existing relation by repeatedly requesting by the client current data items from the database in order with respect to the partial order (sorting order) until the position of the desired data item or the desired data item itself is identified in the partially ordered set. Upon reception of a requested current data item, said data item is decrypted by the client in order to determine which next encrypted current data to request from the database (left/right node regarding the current data item). Again, this step by step approach takes multiple roundtrips and increases significantly the data traffic in the network connecting the client system and the server system. Such methods for accessing encrypted data items using a partially ordered set have been disclosed in published European patent applications EP 2 731 044 A1, EP 2 731 045 A1. The contents of the identified publications EP 2 731 044 A1, EP 2 731 045 A1 are hereby incorporated by reference.

Thus, inserting of bulk data items offline in the data table as described above may be beneficial since it does not require the client system to process every data item separately from the other data items of the bulk. For example the client system may be communicating with the database via a mobile telecommunication network. Such a network typically has a high data transmission speed but a rather slow response time (i.e. a high latency time). Instead of having to wait for each request for a respective response from the database, the database is contacted only once for uploading the finished table comprising the bulk inserted data items.

According to one embodiment, the method further comprises: after storing the data table on the client computer connecting the client computer to a server computer and sending the data table to the server computer via the connection for performing storing the data table on the server computer as the tree data structure.

Connecting to the server system only after preparing the data table may further reduce the network utilization. In order to further reduce the network utilization, the present method may, for example, comprise: after sending the data table disconnecting the client system from the network that connects the client system and the server system.

According to one embodiment, the columns represent respective attributes, the attributes comprising for a given node a: parent attribute indicating the parent node of the given node; right child attribute indicating the right child node of the given node; left child attribute indicating the left child node of the given node; height attribute indicating the height of the given node in the tree data structure; data attribute item indicating the data items; list attribute indicating the resorting order of each row of the data table. This may enable to identify the position of each node in the tree data structure using only a single row of the data table. A value of the list attribute may be referred to as "seq" herein.

According to one embodiment, generating the data table comprises iteratively creating the rows of the data table, iteratively creating the rows comprising: selecting an item of the resorted items in the order of resorting; determining the values of the attributes for the selected item, and storing the values in the row of the data table corresponding to the selected data item. This may enable a systematic and automatic approach for creating the data table based on the order of resorting using the current row and the number of data items only.

According to one embodiment, wherein for a number N of data items the data table has the following structure:
the data item attribute comprising the resorted data items as values of the data item attribute;
the list attribute comprising a number indicating the resorting order seq;
for each row of the data table having a resorting order seq:
the height attribute as a value $$height_n(i) = h(n) - h(i) + 1 - \left[\frac{i}{2^{h(i)}} - \frac{n+1}{2^{h(n)}}\right],$$

where i=seq, n=N+1 and h(i)=log$_2$[i]
the right child attribute having value of 2*seq+1;
the left child attribute having value of 2*seq;
the parent attribute having value as the integer part of the ration seq/2.

According to one embodiment, the tree data structure is a rooted full binary tree, wherein the data table has the following structure:
the attribute values of the first ordered row of the data table are comprising the height attribute value of h, wherein h is the height of the tree data structure obtained using the number of nodes; an empty value of the parent attribute value; a first initial value 3 of the right child attribute value; a second initial value 2 the left child attribute value; a value 1 of the list attribute;
the attribute values of the remaining rows of the data table are comprising the height value of the first row being iteratively decremented by 1 for the height attribute of each subsequent group of m rows of the remaining rows, wherein m is equal to $2^j$, where j is initialized to 1 and iteratively incremented by 1 after processing each group of m rows; the first initial value iteratively incremented by 2 for the right child attribute of each subsequent row of the remaining rows until the right child attribute value has the highest number that is smaller or equal than the number of nodes; the second initial value iteratively incremented by 2 for the left child attribute of each subsequent row of the remaining rows until the left child attribute value has the highest number that is smaller or equal than the number of nodes; for the parent attribute of each subsequent pair of rows of the remaining rows a value incremented by 1, wherein the first pair of rows have value 1 of the parent attribute; the value 1 being iteratively incremented by 1 for the list attribute of each subsequent row of the remaining rows. In this way, the list attribute has value 1 in the first row, value 2 in the second row and so on.

The m refers to the number of nodes per level of the tree data structure, and j refers to the level of the tree data structure. The level of the root node as used herein is 0.

Providing a predefined structure of the data table may enable an efficient way of generating the data table. For example, this may enable providing rules for generating the data table in a systematic, automatic and straight-forward way and may thus save processing time that would otherwise be required by a step-by-step method. This embodiment may particularly be advantageous in case of a large amount of data items for which a binary tree is to be generated.

It has to be noted that this embodiment relates to a structure of the table and is not to be understood as a list of instructions how the table is generated. In principle there are various ways how to calculate the attribute values of the table once the general structure is known.

One way of calculation of the attribute values is generating the data table based only on the number of nodes. This may provide a most efficient method for generating a data table having information required for storing and/or generating a tree data structure e.g. on a remote system.

According to one embodiment, the data table is generated row by row or column by column. This embodiment may enable a flexible method for generating the data table depending e.g. on the size or the number of the data items. For example, the usage of the row by row or column by column method may be decided based on the number of the data items. If the number of the items is higher than a predefined threshold, the column by column approach may be used otherwise the row by row approach may be used. Having a high number of data items may slow down the method of the row by row compared to the column by column in particular if the columns have systematically repeated values.

According to one embodiment, wherein a parent value variable of 1 is provided, wherein a setting of the parent attribute value for the rows that are different from the first row is iteratively performed row by row comprising: if the list attribute value (seq) of the current row is an even number, setting the parent attribute to the parent value; if the list attribute value of the current row is an odd number, setting the parent attribute to the parent value and incrementing the parent value by 1. In other terms, the parent attribute value for a given row is set to the integer part of the ratio seq/2, where seq is the list attribute value of the given row. For example, if the ratio result in a float value y.xx, the the parent attribute value may be set to y.

According to one embodiment, wherein a setting of the right and left child attribute values for the rows that are different from the first row is iteratively performed row by row comprising: if the list attribute value of the current row multiplied by two is smaller (<) than or equal to (=) the number of nodes of the tree setting the left child attribute value to the list attribute value of the current row multiplied by two; otherwise leaving empty the left child attribute; if the list attribute value of the current row multiplied by two plus one is smaller (<) than or equal to (=) the number of nodes of the tree setting the right child attribute value to the list attribute value of the current row multiplied by two plus one; otherwise leaving empty the right child attribute. In other terms, the left child attribute value of a row is equal to 2*seq, and the right child attribute value of a row is equal to 2*seq+1, wherein seq is the list attribute value of the row indicative of the order of the row in the data table.

Using only a sequence of number for determining the edges of the nodes may provide an optimal way for defining a tree data structure using the data table.

According to one embodiment, the attributes are further comprising a left parent attribute indicating whether the given node is its parent's left child or not, wherein the left parent attribute value is empty for the first ordered row, wherein the value of the left parent attribute for the remaining rows is alternating between a value indicating the given node is its parent's left child and a value indicating the given node is not its parent's left child. This may further improve the determination of the positioning of the nodes within the tree data structure.

According to one embodiment, the method further comprises setting of the left parent attribute values for the remaining rows, the setting comprising: setting the left parent attribute value to a value indicating the given node is its parent's left child for the rows having list attribute values which are even numbers, and setting the left parent attribute value to a value indicating the given node is not its parent's left child for the rows having list attribute values which are odd numbers. In other terms, the left parent attribute value is set as follows: if the number (seq) of the row indicating the order of the row in the data table is=1, the left parent attribute value is null; otherwise, the left parent attribute value is set to the result of the condition (seq modulo 2=0).

According to one embodiment, the attributes further comprises a sort attribute indicating the sorting order of the given node. Having a sort attribute indicating the sorting order of the nodes may enable to define a database index, which can be used during interval searches. The purpose of the sort attribute is evident for example from EP 2 731 046 A1, where in the partially ordered set encrypted data items are annotated with elements of a linear order, that linear being the same order that is expressed by the partial order. This linear order corresponds to the above discussed predefined order. Using an interval search method, the database can be instructed to retrieve the first element of the linear order annotated to the encrypted data item forming the first interval boundary and to retrieve the second element of the linear order annotated to the encrypted data item forming the second interval boundary. Thereupon, all encrypted data items having annotated the elements of linear order in between the first element and the second element can be retrieved.

According to one embodiment, the value of the left child attribute of a given row is the list attribute value of the row multiplied by 2 or is an empty value if the list attribute value of the row multiplied by 2 is greater than the number N of rows (seq·2>N). According to another embodiment, the value of the right child attribute of a given row is the list attribute value of the row multiplied by 2 plus 1 or is an empty value if the list attribute value of the row multiplied by 2 plus 1 is greater than the number N of rows (seq·2+1>N). In other terms, the left and right child attributes values are set to an empty value for the leaf nodes of the tree data structure.

According to one embodiment, the method further comprises storing the data table in a main memory of the client computer. From the main memory the data table may then be transferred to an e.g. relational database system where queries on the data table can directly be processed. Thus, the purpose of the client is to generate a tree comprising data items, wherein the data table is a representation of the tree.

In another aspect, the invention relates to a computer program product comprising computer executable instructions to perform the method as provided in any of the previous embodiments.

In another aspect, the invention relates to a client system for providing a tree data structure from bulk data comprising data items, wherein an algorithm adapted for resorting sorted data items in accordance with levels and the ordering of the nodes within each level of a tree data structure is provided, each data item corresponding to a node of the tree data structure. The client system is configured for:
  receiving at a client computer the data items to be stored on the tree data structure;
  sorting the received data items in accordance with a predefined sorting order;
  processing at the client computer the algorithm for resorting the sorted received data items;
  generating a data table for representing the tree data structure in a tabular form having columns and rows, wherein in accordance with the resorting order each row of the data table represents a respective resorted data item, wherein values in the columns are determined in accordance with the order of the rows;
  storing the data table as the tree data structure.

BRIEF DESCRIPTION OF THE SEVERAL VIEWS OF THE DRAWINGS

In the following embodiments of the invention are explained in greater detail, by way of example only, making reference to the drawings in which:
FIG. 5 depicts the structure of a data table that is generated in accordance with an example method.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
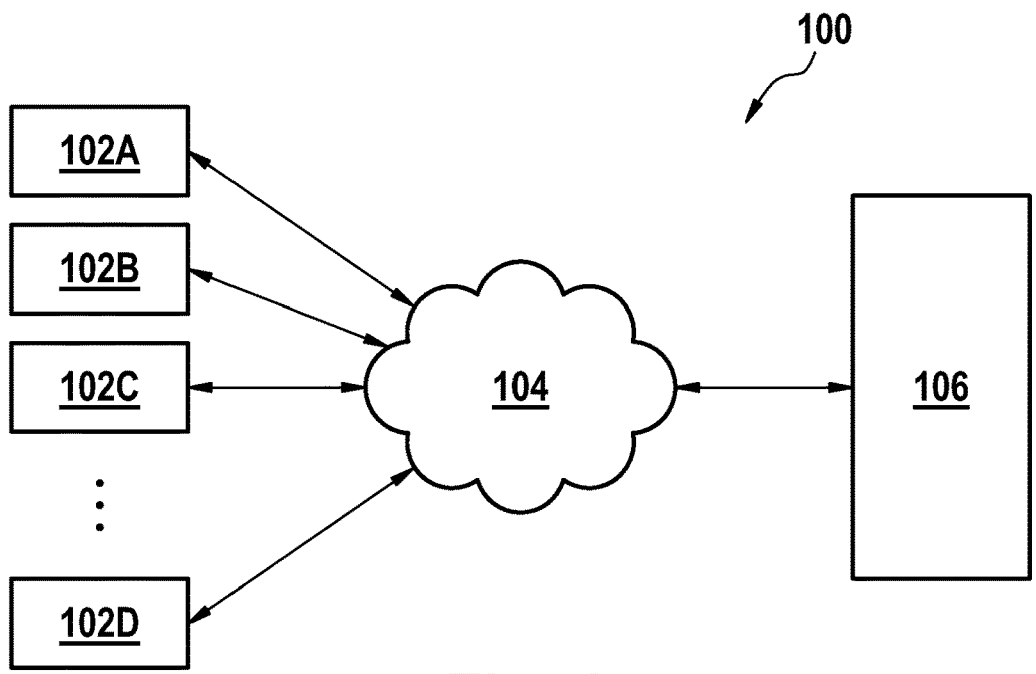
FIG. 1 depicts a schematic block diagram of a client-server system.

FIG. 1 shows a schematic block diagram of a client-server system 100 in accordance with the present disclosure. The client-server system 100 comprises one or more client systems (or client computers) 102A-N and a server system (or server computer) 106. The client system 102A-N and the server system 106 are connected over a network connection 104. The client system 102 can be regarded as a computer system that is able to communicate with the server system 106 via the network connection 104 which comprises for example a wireless local area network (WLAN) connection, WAN (Wide Area Network) connection LAN (Local Area Network) connection or a combination thereof. The server system 106 can be regarded as a computer system that is able to provide data access to the client system 102. In order to access data stored on the server system 106, the client system 102 sends a request to the server 106, where the request is received and processed at the server system 106.

For example, client-server system 100 may be a medical system, in which the client system 102A-N may be part of a medical office or a hospital and the server system 106 may be located in an external database center, like a cloud computing center.

For example, a client system 102A-N may comprise a portable electronic telecommunication device, such as a mobile radio, digital cellular mobile telephone, such as a smartphone or tablet computer, palmtop, laptop, notebook, PDA (personal digital assistant), or other mobile computer device which is connectable to network 104. This may particularly be beneficial for applications that involve terrestrial users in vehicles or on foot, such as for emergency responder organizations or public works organizations. In the field of the provision of healthcare services this may particularly be beneficial as it may enable the use of a mobile portable battery powered client device in the context of emergency medical services and/or home visits of patients by medical doctors, while maintaining high data privacy standards.

For example, the client-server system 100 may provide a cloud environment where the multiple client systems 102A-C may form a group of computers that is part of multiple groups or clusters of computers in the cloud environment. The multiple client systems 102A-C may act like a single system that provides services to respective users of the cloud environment. For example, the multiple client systems 102A-C may be assigned a common group public key and a group private key that can be used to (uniformly) encrypt the data at the multiple client systems 102A-C.

For example, the multiple client systems 102A-C may belong to an organizational entity, such as a health service provider, and may be located in a respective access restricted environment, such as a hospital. Access restriction to the environment can be implemented by physical, such as edificial, and/or organizational measures and/or by an electronic access control system. Such restricted environment is a trusted environment in which confidentiality of data items, such as patients' medical records, is preserved.

As used herein the term "server" or server system refers to any computerized component (e.g. a software component), system or entity regardless of form that is adapted to provide data, files, applications, content, or other services to one or more other devices or entities.

The server system 106 is configured for accessing and controlling access to a patient database comprising patient data. The access to the patient database may be performed using a tree data structure.

Figure 2:
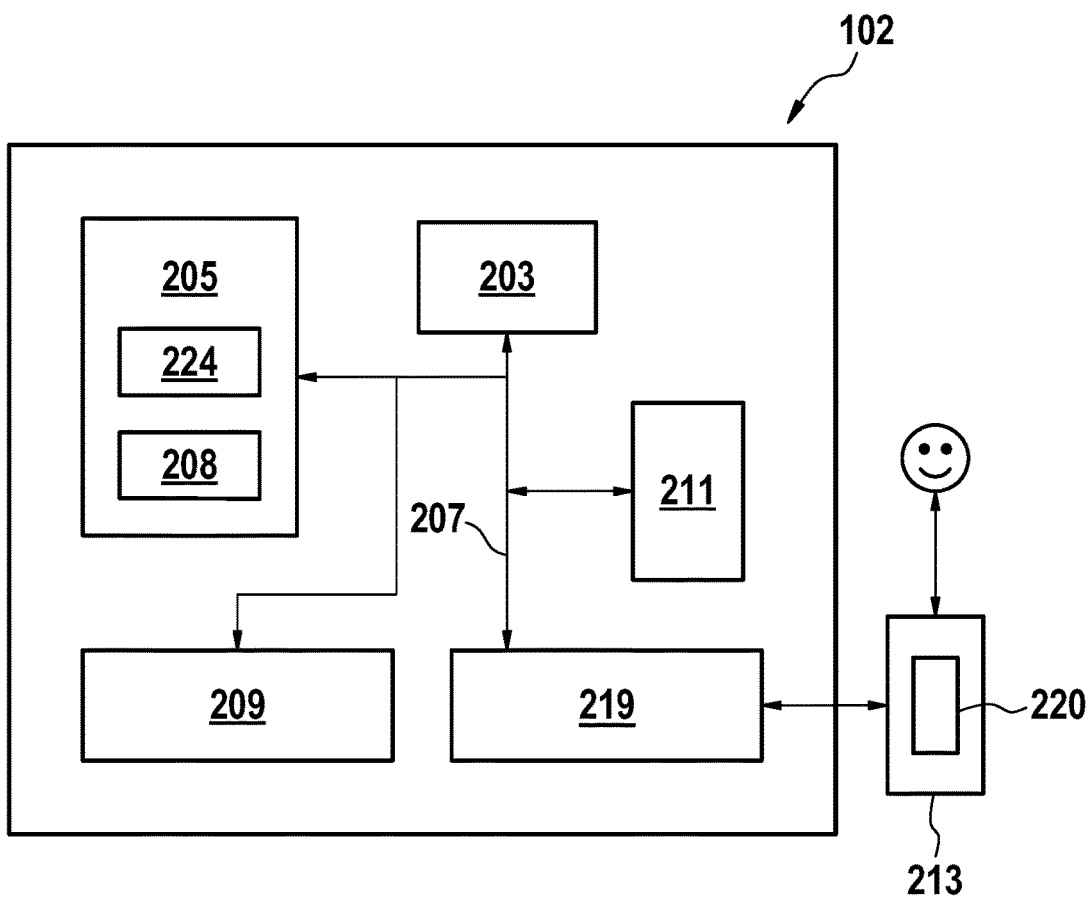
FIG. 2 depicts a schematic block diagram of a client or server system.

FIG. 2 shows a schematic block diagram of a computer system 102 such as one of the client systems 102A-N in accordance with the present disclosure. The components of the computer system 102 may include, but are not limited to, one or more processors or processing units 203, a storage system 211, a memory unit 205, and a bus 207 that couples various system components including memory unit 205 to processor 203. The storage system 211 may include for example a hard disk drive (HDD). The memory unit 205 may include computer system readable media in the form of volatile memory, such as random access memory (RAM) and/or cache memory. The client system 102 typically includes a variety of computer system readable media. Such media may be any available media that is accessible by the client system 102, and it includes both volatile and non-volatile media, removable and non-removable media.

The client system 102 may also communicate with one or more external devices such as a keyboard, a pointing device, a display 213, etc.; one or more devices that enable a user to interact with client system 102; and/or any devices (e.g., network card, modem, etc.) that enable the client system 102 to communicate with one or more other computing devices. Such communication can occur via I/O interface(s) 219. Still yet, the client system 102 can communicate with one or more networks such as a local area network (LAN), a general wide area network (WAN), and/or a public network (e.g., the Internet) via a network adapter 209. As depicted, the network adapter 209 communicates with the other components of the client system 102 via bus 207.

The memory unit 205 is configured to store applications that are executable on the processor 203. For example, the memory unit 205 may comprise an operating system as well as application programs. The application programs comprise a data access application 208. The data access application 208 comprises instructions that when executed enable a user of the client system 102 to request data residing on server system 106 and/or to perform at least part of the present method. For example, the execution of the instructions may cause the processor 203 to display information on a graphical user interface 220. The graphical user interface 220 comprises search fields that are configured to receive inputs indicative for example of data items.

The client system 102 may further comprise a cache 224. The term "cache" as used herein refers to a temporary storage area that is a high-speed access area and may be either a memory cache or a disk cache. The cache may, for example, be a portion on memory of high-speed static RAM (SRAM) or may be part of main memory e.g. made up of dynamic RAM (DRAM).

Figure 3:
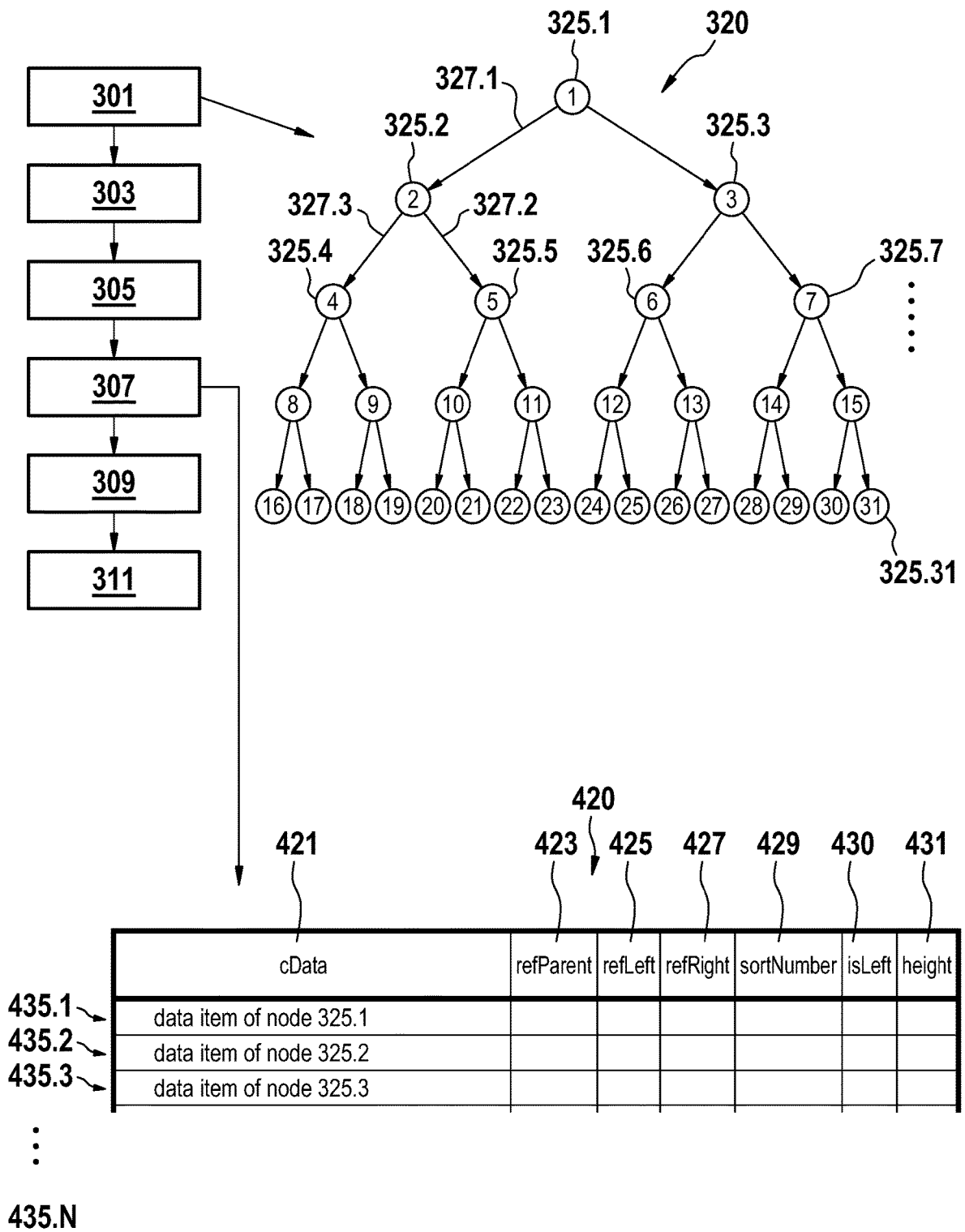
FIG. 3 is a flowchart of a method for providing a tree data structure from bulk data comprising data items.

FIG. 3 is a flowchart of a method for providing a tree data structure from bulk data comprising data items. For example, the client computer 102A of FIG. 1 may be configured to upload data items like patient names and associated patient records to the server system 106. At the server system, the data items are stored as a binary tree which permits to perform infix, postfix and prefix queries as described for example in EP 2 731 044 A1, EP 2 731 045 A1 and EP 2 731 046 A1. Instead of sending each individual data item to the server 106 for inserting the data item into a tree stored in a database of the server system, the method discussed below permits preparing the tree at the client 102A and to upload data representing the whole tree to the server 106. In the following, without restriction to generality it is assumed that the tree is a rooted full binary tree. Starting point is a sorted list of data items for which a tree is to be provided in a database of the server. The sorting order is without restriction to generality assumed to be in accordance with an alphabetical order. This sorted list is then resorted in accordance with levels and the ordering of the nodes within each level of the desired rooted binary tree (or tree data structure). This resorting is also known as breadth-first search. Each data item corresponds to a node of the tree data structure. The data items may for example comprise names such as "Nora", "Isabelle", "Elwood", "Blythe", "Tom", "Bronte" and "Barton" that can be used to access detailed patient information associated with each name in the database.

For exemplification purpose, FIG. 3 further shows a tree data structure 320 having a predefined number of nodes (collectively referred to by 325). Each node 325 of the tree data structure 320 may represent or contain a respective data item. For simplicity of the description the terms node and data item may be interchangeably used.

In step 301, the data items to be stored on the tree data structure 320 may be received at the client computer e.g. 102A. The reception of the data items may be automatic. This may speed up the process of generating the table. In another example, the reception of the data items may be performed in response to a request e.g. sent by client computer 102A to the sender of the data items. This may provide a controlled method for generating the tree data structure.

In one example, the data items may be read or accessed from an input device of a user of the client computer 102A. In another example, the user of the client computer 102A may enter the data item (e.g. via graphical user interface) to the client computer 102A.

The received data items may or may not be encrypted items. For example, the received data items may be encrypted with a predefined encryption method. The encryption method, when executed for a given data item, encrypts the data item using for example a cryptographic key. The cryptographic key may be a symmetric or an asymmetric key.

A "cryptographic key" as used herein encompasses a symmetric key that serves both for encryption and decryption as well as an asymmetric cryptographic key pair.

The received data items may be sorted in step 303 in accordance with a predefined sorting order. The sorting order may for example comprise an alphabetical or lexicographical order or category order or size order or any context specified order e.g. sorting by location of sources or senders of the data items. Following the above simplified example of the names, the sorted items may be in the following order: "Barton", "Blythe", "Bronte", "Elwood", "Isabelle", "Nora", and "Tom".

In case the data items are encrypted data items, the sorting is performed using the unencrypted content of the received data items.

In step 305, the above mentioned algorithm may be processed at the client computer 102A for resorting the sorted data items. In the example of FIG. 3, the resorting results in ordered data items 325.1 to 325.31, where data item 325.1 is the first ordered data item and would correspond to the root node of the tree data structure 320, while the second ordered data item 325.2 would correspond to the left child node of the root node and so on. The resorted data items follow the numbering order 325.1 to 325.31 (FIG. 5 describes an example algorithm for performing the resorting). Following the above simplified example of the names, the resorted items may be in the following order: "Elwood", "Blythe", "Nora", "Barton", "Bronte", "Isabelle" and "Tom". Node 325.1 will thus correspond to "Elwood", node 325.2 will correspond to "Blythe", node 325.3 will correspond to "Nora", node 325.4 will correspond to "Barton" etc.

Referring back to FIG. 3, in step 307, a data table 420 may be generated for representing the tree data structure 320 in a tabular form having columns and rows 435. In accordance with the resorting order (325.1 to 325.31) each row 435 of the data table represents a respective resorted data item. For example, the first row 435.1 of the data table 420 would represent or contain the data item 325.1 as a root of the tree data structure. Using the number of nodes and the resorting order, attribute values of the remaining rows may be defined.

The processing or filling of the subsequent rows in accordance with the resorting order can be described, for simplicity, in other words by referring to the tree data structure properties such as a level of the nodes. For example, the processing of the subsequent rows in accordance with the resorting order comprises the processing of the nodes of the tree data structure level by level (e.g. in accordance with a breadth-first search method) starting from the top level (level of node 325.1) and moving from the left to the right. For example, after processing the root node, the subsequent level 1 may be processed and the nodes of the level 1 may be processed from left to right. In this case, the second row 435.2 of the data table 420 would represent data item 325.2 which is the left child of the root node 325.1. The third row 435.3 of the data table 420 would represent data item 325.3 which is the right child of the node 325.1. After processing the nodes of level 1 the subsequent level 2 may be processed and the nodes 325.4-7 may be processed from left to the right such that the fourth row 435.4 of the data table 420 would represent data item 325.4 and so on. Following the example of FIG. 3, the last row 435.31 of the data table 420 would represent the data item 325.31. The rows of the data table 420 are ordered in sequence from row 435.1 to row 435.31. For simplicity of the description only rows 435.1-435.3 are shown.

The data table 420 may for example be stored and manipulated in the memory 205 or cache 224 of the client system 102A. This may enable a fast processing of the data table 420 and thus would speed up the whole process of providing the tree data structure. Having the data table created and stored in the cache 422 already at the beginning of data processing may be advantageous as the CPU may not need the logic for switching between the main memory and the cache which may further speed up the processing of the present method.

In accordance with the order (435.1 to 435.31) of nodes and thus rows in the data table 420, in step 309 for each node 325 the edges of the node 325 are determined. Columns of the data table 420 represent attributes 421-431. For example, attributes 423, 425 and 427 are indicative of these edges. In this example of FIG. 3, the attributes comprise a data attribute (cData) 421 indicating the data items to be stored in the data table 420. The column corresponding to the data attribute 421 comprises the data items. Following the above example of names, the column 421 may comprise the names in the encrypted or in unencrypted format following the resorted order e.g. "Elwood", "Blythe", "Nora", "Barton", "Bronte", "Isabelle" and "Tom" are stored in respective rows 435.1-7.

The attributes of the data table 420 further comprise an attribute (refParent) 423 which is a parent attribute indicating the parent node of a given node that is represented by a row. The attributes of the data table 420 further comprise an attribute (refLeft) 425 which is a left child attribute indicating the left child node of a given node that is represented by a row. The attributes of the data table 420 further comprise an attribute (refRight) 427 which is a right child attribute indicating the right child node of a given node that is represented by a row. The attributes of the data table 420 further comprise an attribute (sortNumber) 429 which is a number indicating the position of a given node that is represented by the row relative to the other nodes within the predefined sorting order. In the above example, "Barton" would have a smaller number than "Blythe", "Blythe" would have a smaller number than "Bronte", "Bronte" would have a smaller number than "Elwood" etc. Also, negative numbers are possible here.

The purpose of the sortNumber is evident for example from EP 2 731 046 A1, where in the partially ordered set encrypted data items are annotated with elements of a linear order, the linear order corresponding to the order in which the encrypted data items are stored in the database with respect to the partial ordered set. This linear order corresponds to the above discussed predefined order. Using an interval search method, the database can be instructed to retrieve the first element of the linear order annotated to the encrypted data item forming the first interval boundary and to retrieve the second element of the linear order annotated to the encrypted data item forming the second interval boundary. Thereupon, all encrypted data items having annotated the elements of linear order in between the first element and the second element can be retrieved.

The attributes of the data table 420 further comprise an attribute (isLeft) 430 which is a left parent attribute indicating whether the given node is its parent's left child or not. For example, the value of the attribute 430 may indicate whether node 325.2 is the left child node of its parent node 325.1 or not. The left parent attribute may improve rebalancing after tree updates of the tree data structure.

The attributes of the data table 420 further comprise an attribute (height) 431 which is a height attribute indicating the height of a given node that is represented by a row of the data table 420. The height of a node refers to the length of the longest path from the node to the tree's leaf level.

For example edges 327.1-3 may be determined for the node 325.2. Determining the edges of a given node may comprise determining the position of the given node in the tree data structure 320. Thus, for determining the edges of a given node values of at least part of the attributes 421-431 in a row representing the given node may be used. For example, edges 327.1-3 of node 325.2 may be determined using at least part of attribute values 421-431 stored in the row 435.2 that represents the node 325.2.

Figures 4, 6:
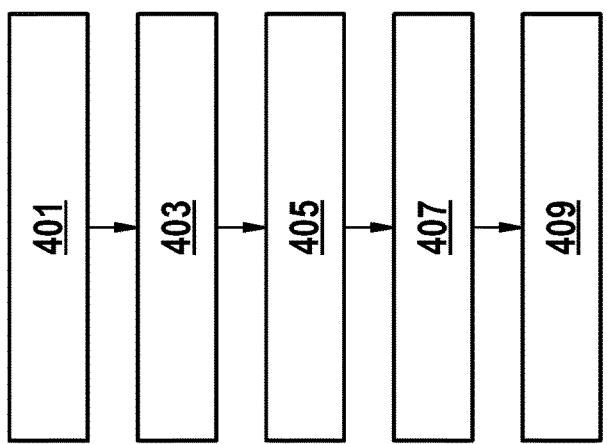
FIG. 4 is a flowchart of a method for generating a data table.
FIG. 6 depicts pseudocode describing an algorithm for performing resorting.

The determining of values of the at least part of the attributes 421-431 may be performed row by row or column by column. FIGS. 4 and 5 provide example methods for determining the values of the attributes 421-431.

For example, steps 301-309 may be performed at the client system 102A offline without requiring connection to the server system 106.

In step 311, the data table 420 may be stored as the tree data structure. The storing of the data table 420 may comprise connecting the client system 102A to the server system 106 and sending the data table to the server computer via the connection for performing the storing. In this way, the data table may be used at the server for performing a tree traversal for accessing data e.g. associated with the names in the column 421.

FIG. 4 is a flowchart of a method, further detailing step 309, for setting at least part of the attributes 421-431. In this example of FIG. 4, the tree data structure 320 may be a full binary tree. The result of performing the steps of FIG. 4 is depicted in FIG. 5.

In step 401, the attribute values of the first ordered row 435.1 of the data table 420 may be set. This may for example be done by setting the height attribute value 431 to h, where h can be determined using the number of data items N. For example, $h=\lceil \log_2 N+1 \rceil$. The parent attribute value 423 of the first row 435.1 may be left empty since the first row corresponds to the root node 325.1. Furthermore, a first initial value 3 may be used to initiate or set the right child attribute value to 3. The first initial value indicates the order (the order of a row is also referred to as "seq" in the present disclosure e.g. in FIG. 5) 3 of the row 435.3 that corresponds to the right child node 325.3 of the root node 325.1. A second initial value 2 may be used to initiate or set the left child attribute value to 2. The second initial value indicates the order 2 of the row 435.2 that corresponds to the left child node 325.2 of the root node 325.1. In this way, using only the number of nodes N and the resorting order of the rows the values of the attributes in the first row and the remaining rows may be determined.

After processing the first row, the remaining rows 435.2-435.N may be processed row by row or column by column or by processing part of the data table column wise and the other part row wise. Providing multiple methods for setting the attribute values may enable a more efficient method for generating the data table 420. For example, depending on the number of data items a suitable method may be chosen for generating the data table.

Thus, in order to process the remaining rows, in step 403, the height attribute value of the remaining rows may be set in a way that the height value of the first row is iteratively decremented by 1 for each subsequent group of m rows of the remaining rows. m is equal to $2^j$, where j is initialized to 1 and iteratively incremented by 1 after processing each group of m rows. For example, j=1 for the group of $2^j$ rows 435.2-435.3 and may be incremented by 1 to become j=2 for the subsequent group of $2^j$=4 rows 435.4-435.7. This may enable using only the number of nodes and the resorting order (which is indicated by a number assigned the row) for setting the attribute values without requiring e.g. additional information such as the level of the tree data structure etc.

In other terms, m is a variable number that indicates the number of nodes per level of the tree data structure. For example, the level 1 of the tree data structure 320 comprises two nodes 325.2 and 325.3. In this case, m=1, and the height value h is decremented by 1 to become h−1 for the second 435.2 and third 435.3 rows for the data table 420. In a following level 2, the group of rows would comprise 4 rows that represent the 4 nodes 325.4-7 of the level 2 of the tree data structure 320. In this case, m=4 and the height value h−1 is decremented by 1 to become h−2 for the four rows 435.4-7. The last rows that correspond to the leaf nodes of the data structure may have height attribute value of 1.

Step 403 may for example be performed row by row in parallel with the determination of the other attribute values or may be performed at once for all rows of the column or attribute height 431 before determining the other attributes values of the remaining rows.

In step 405, the right child attribute value 427 of the remaining rows may be set in a way that the first initial value is iteratively incremented by 2 for the right child attribute of each subsequent row of the remaining rows until reaching the highest number that is smaller than or equal to the number of nodes N. For example, for the second row 435.2, the right child attribute value may be set to 3+2*i, where i indicates the sequential order (=resorting order−1 or shifted by one order) in which the remaining rows are processed. Since one start from the second row, i would equal 1, i=1, for the second row and the right child attribute value may thus be 5. For the subsequent third row 435.3, i would be 2 and the right child attribute value would be 7 and so on until the right child attribute value 31 is reached, which is the highest value of the right child attribute that is smaller than or equal to N=31 in the example of FIGS. 3 and 4.

In step 407, the left child attribute value 425 of the remaining rows may be set in a way that the second initial value is iteratively incremented by 2 for the left child attribute of each subsequent row of the remaining rows until reaching the highest number that is smaller than the number of nodes N. For example, for the second row 435.2, the left child attribute value may be set to 2+2*i, where i indicates the sequential order in which the remaining rows are processed. Since we start from the second row, i=1 for the second row and the left child attribute value may thus be 4. For the subsequent third row 435.3, i would be 2 and left right child attribute value would be 6 and so on until the left child attribute value 30 is reached, which is the highest value of the left child attribute that is smaller than or equal to N=31 in the example of FIGS. 3 and 4.

In step 409, the parent attribute value 423 may be set in a way that for each subsequent pair of rows of the remaining rows a value P incremented by 1. The value P may be initialized to 1 for the first pair of rows of the remaining rows to be processed. In other terms, a value indicating the order of the pair is set to the parent attribute 423 of the respective pair of rows. For example, the remaining rows form the following sequential pairs of rows (435.v, 435.{v+1}), where v varies from 2 to 30. The first pair in the sequence is the pair (435.2, 435.3), and the second pair is (435.4, 435.5) and so on. The pairs are disjoint in that a pair cannot contain a row of another pair.

In addition, the resorted data items may be stored in the respective column 421 of the data table.

In one example, steps 403-409 may each be applied independently on the respective columns 431, 427, 425 and 423. This may for example be done in parallel. This may be advantageous as it may further speed up the process of the present method. The parallel processing may for example be performed using a multi-processor unit e.g. 203.

In another example, at least two steps of steps 403-409 may be performed together for each row of the remaining rows. For example, for a given row, steps 405 and 407 may be performed, then for a subsequent row, steps 405 and 407 may be performed and so on. While steps 403 and 409 may be performed independently on the respective whole columns e.g. while the second row is being filled with values calculated in steps 405 and 407, all the rows of the remaining columns 431 and 423 may be filled with attribute values. For example, the columns that comprise high number of systematic values such as column representing height attribute 431 (e.g. the height has 16 times value 1) may be processed column wise as this may enable to collectively set rows of the column 431. While a column such as the column representing the right child attribute 427 having values changing may be processed row wise. This may enable an efficient method for generating the data table that may further reduce the processing time.

In an alternative example, the data table 420 may be generated as follows. The height attribute may be set (step A) for each row i to a value of the function $$height_n(i) = h(n) - h(i) + 1 - \left[ \frac{i}{2^{h(i)}} - \frac{n+1}{2^{h(n)}} \right],$$

where n=N+1 and h(i) is $\log_2(i)$. The right child attribute may be set (step B) for each row having order seq to 2*seq+1. The left child attribute may be set (step C) for each row having order seq to 2*seq. And the parent attribute may be set (step D) for each row having order seq to the integer part of the ration seq/2. As described above, the steps A-D may be processed similarly by row and/or column wise methods. For example, steps A-D of the alternative example may each be applied independently on the respective columns. This may for example be done in parallel.

FIG. 5 depicts the structure of a data table 520 that is generated in accordance with the present method for a number of nodes N=31. The data table 520 comprises attributes 501 and 521-531. The attributes 521-531 are corresponding to the respective attributes 421-431.

It is the goal to obtain a binary tree having attribute values following the general schema shown in columns 501, 523, 525, 527, 529, 530 and 531 of FIG. 5. In the most general way it does not matter how the attribute values are calculated since there are multiple ways to do that. Not all columns may be necessary or required. The following discussion will define rules the attribute values follow in each column. However, these rules shall not be understood as an instruction how to calculate or determine the attribute values.

The list attribute 501 comprises a sequential integer number that represents the order number (which is also referred to by seq 501 in FIG. 5) of each row in the data table. For example, the rows 535.1-31 comprise the numbers 1-31 respectively for the list attribute 501.

The data attribute (cData) 521 comprises for example the encrypted data items. For example, the resorted data items 325.1-325.31 are stored on the respective rows 535.1-31 of the column or attribute 521.

The parent attribute (refParent) 523 comprises values indicating the parent node of a given node. The values of the parent attribute 523 may be set in data table 520 by leaving the value of the parent attribute 523 empty (=null) in the first row 535.1, and for the remaining rows 535.2-535.31 a sequential numbering with assigning each number for two consecutive rows: null, 1, 1, 2, 2, 3, 3, . . . , $2^{c-1}-1$, where $N+1=2^c$.

The left child node attribute (refLeft) 525 comprises values indicating the left child node of a given node. The values of the left child node attribute 525 may be set in data table 520 by numbering each row with steadily increasing even numbers of the list attribute 501, starting with 2. And the setting may stop at the last row with height 2. All following nodes are nodes at the leaf level, i.e., they have no children. In another example, the left child node attribute (refLeft) 525 of a given row having a list attribute value seq may be set to 2*seq.

The right child node attribute (refRight) 527 comprises values indicating the right child node of a given node. The values of the right child node attribute 527 may be set in data table 520 by numbering each row with steadily increasing odd numbers of the list attribute 501, starting with 3. And the setting may stop at the last row with height 2. All following nodes are nodes at the leaf level, i.e., they have no children. In another example, the right child node attribute (refRight) 527 of a given row having a list attribute value seq may be set to 2*seq+1.

The sort attribute (sortNumber) 529 comprises values indicating the sorting order of the given node. The values of the sort attribute 529 may be set in data table 520 by computing the values of the sort attribute for each row of the data table 520 according to the following algorithm (the value c indicates the rounded up 2-based logarithm of the overall data item count:

```
c = ⌈log₂(N+1)⌉ ):
    while (!done){
        if (atFirstItem){
            k = c - 1;
            firstSortNumber = 0 ;
        } else {
            while(k > 0) {
                k = k - 1;
                start = -(2^(c - 1) - 2^k);
                step = 2^(k + 1);
                iterations = 2^(c - k - 1);
                for (i = 0; i < iterations; i++){
                    nextSortNumber = start + i * step;
                }
            }
            done = true;
        }
    }
```

The condition "if (atFirstItem)" would check whether or not the current row is the first row of the data table.

The left parent attribute (isLeft) 530 comprises values indicating whether a given node is its parent's left child or not. The values of the left parent attribute 530 may be set in data table 520 by leave the left parent attribute 530 empty in the first row 535.1, and for the remaining rows 535.2-535.31 the lift attribute us set in each subsequent row to true and false alternately.

The height attribute value (height) 531 comprises values indicating the height of a given node. The values of the height attribute 531 may be set in data table 520 by computing h=log₂(N+1) and setting the height attribute in the first row to h, and for the remaining rows 535.2-535.31 the following two rows may be set to h−1, the following four rows to h−2 etc., until the last $16=2^{h-1}$ rows which are set to 1. In another example, the height attribute of each row having order "seq" may be set to a $$height_n(i) = h(n) - h(i) + 1 - \left\lceil \frac{i}{2^{h(i)}} - \frac{n+1}{2^{h(n)}} \right\rceil,$$

value of where i=seq, n=N+1 and h(i)=⌈log₂(i)⌉.

Using the above mentioned rules it is thus possible to quickly and efficiently generate a partially ordered set of data items from bulk data items without the need to individually send the data items in a step-by-step procedure to the database of a server for storage. Instead the whole tree is generated using the rules at the client and then uploaded to the database.

FIG. 6 depicts a pseudocode describing the algorithm 600 for performing the resorting.

Vector x 601 is an array of data items (e.g. the received data items of step 301). The function x.sort( ) performs a sorting of the array x in order to bring x in a sorted order, according to a predefined sorting order, e.g. lexicographic.

The term "intervals" 603 refers to an array of intervals to be processed by the algorithm 600. As shown in FIG. 6, the intervals array 603 is initialized with one interval that represents the entire array x from index 0 to index x.length.

The function intervals.shift( ) removes the first element from intervals 603 and stores it in variable iv which is an interval. Each interval iv consists of a lower border element iv.low 605 and a higher border element iv.high 607.

Using the lower and the higher borders 605 and 607, a middle point 609 can be defined by the following formula: middle=⌊(iv.low+iv.high)/2⌋. This formula computes the rounded arithmetic mean of an interval iv's borders 605 and 607 and stores it in variable middle 609.

Using the calculated middle 609, a result array may be filled using the function result.push(x[middle]). This function gets the data item at position middle 609 of array x 601 and adds the data item to the result array at its last position. Following the above simplified example, the name "Elwood" may be the first data item to be identified by using x[middle].

Upon filling the result array, zero, one or two new interval elements with borders low and high may be added to the end of intervals 603 via the function intervals.push(low,high). This process may be repeated until the sorted data items are put in the result array in the resorted order.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for providing a tree data structure from bulk data comprising data items, comprising:
    providing an algorithm adapted for resorting sorted data items in accordance with levels and the ordering of nodes within each level of a tree data structure, each data item corresponding to a node of the tree data structure;
    receiving at a client computer the data items to be stored on the tree data structure;
    sorting the received data items in accordance with a predefined sorting order;
    processing at the client computer the algorithm for resorting the sorted received data items;
    generating a data table for representing the tree data structure in a tabular form having columns and rows, wherein in accordance with the resorting order each row of the data table represents a respective resorted data item, wherein values in the columns are determined in accordance with the order of the rows, and wherein the columns represent attributes, the attributes comprising for a given node a:
        parent attribute indicating a parent node of the given node;
        right child attribute indicating a right child node of the given node;
        left child attribute indicating a left child node of the given node;
        height attribute indicating a height of the given node in the tree data structure;
        data attribute item indicating the data items;
        list attribute indicating the resorting order of each row of the data table;
    generating the data table comprising iteratively creating the rows of the data table comprising:
        selecting an item of the resorted data items in the resorting order;
        determining values of the attributes for the selected item, and
        storing the values in the row of the data table corresponding to the selected data item;
    storing the data table as the tree data structure on the client computer, connecting the client computer to a server computer and sending the data table to the server computer via the connection for performing storing the data table on the server computer as the tree data structure.

2. The method of claim 1, wherein for a number N of data items, the data table has the following structure: the data item attribute comprising the resorted data items as values of the data item attribute; the list attribute comprising a number indicating the resorting order seq; for each row of the data table having a resorting order seq: the height attribute as a value $$height_n(i) = h(n) - h(i) + 1 - \left\lceil \frac{i}{2^{h(i)}} - \frac{n+1}{2^{h(n)}} \right\rceil,$$

wherein n=N+1 and h(i)=⌈log 2(i)⌉;
    the right child attribute having value of 2*seq+1;
    the left child attribute having value of 2*seq; the parent attribute having value as the integer part of the ration seq/2.

3. The method of claim 2, the tree data structure being a full binary tree, wherein the data table has the following structure:
    the attribute values of the first ordered row of the data table comprising
        the height attribute value of h, wherein h is the height of the tree data structure obtained using the number of nodes;
        an empty value of the parent attribute value;
        a first initial value 3 of the right child attribute value;
        a second initial value 2 of the left child attribute value;
        a value 1 of the list attribute;
    the attribute values of the remaining rows of the data table comprising
        the height value of the first row being iteratively decremented by 1 for the height attribute of each subsequent group of m rows of the remaining rows, wherein m is equal to 2j, where j is initialized to 1 and iteratively incremented by 1 after processing each group of m rows;
        the first initial value iteratively incremented by 2 for the right child attribute of each subsequent row of the remaining rows until the right child attribute value is the highest number that is smaller or equal than the number of nodes;
        the second initial value iteratively incremented by 2 for the left child attribute of each subsequent row of the remaining rows until the left child attribute value is the highest number that is smaller than the number of nodes;
        for the parent attribute of each subsequent pair of rows of the remaining rows a value incremented by 1, the first pair of rows having value 1 of the parent attribute;
        the value 1 being iteratively incremented by 1 for the list attribute of each subsequent row of the remaining rows.

4. The method of claim 1, wherein the data table is generated row by row or column by column.

5. The method of claim 2, wherein a parent value of 1 is provided, wherein a setting of the parent attribute value for the rows that are different from the first row is iteratively performed row by row comprising:
    if the list attribute value of the current row is an even number, setting the parent attribute to the parent value;
    if the list attribute value of the current row is an odd number, setting the parent attribute to the parent value and increasing the parent value by 1.

6. The method of claim 2, wherein a setting of the right and left child attribute values for or the rows that are different from the first row is iteratively performed row by row comprising:

If the list attribute value of the current row multiplied by two is smaller (<) than or equal to (=) the number of nodes of the tree setting the left child attribute value to the list attribute value of the current row multiplied by two;

otherwise leaving empty the left child attribute;

If the list attribute value of the current row multiplied by two plus one is smaller (<) than or equal to (=) the number of nodes of the tree setting the right child attribute value to the list attribute value of the current row multiplied by two plus one;

otherwise leaving empty the right child attribute.

7. The method of any of claim 1, the attributes further comprising a left parent attribute indicating whether the given node is its parent's left child or not; wherein the left parent attribute value is empty for the first ordered row; and the value of the left parent attribute for the remaining rows is alternating between a value indicating the given node is its parent's left child and a value indicating the given node is not its parent's left child.

8. The method of claim 7, the method further comprising setting of the left parent attribute values for the remaining rows comprising:

setting the left parent attribute value to a value indicating the given node is its parent's left child for the rows having even list attribute values; and setting the left parent attribute value to a value indicating the given node is not its parent's left child for the rows having odd list attribute values.

9. The method of claim 1, the attributes further comprising a sort attribute indicating the sorting order of the given node.

10. The method of any of claim 2, wherein the value of the left child attribute of a given row is the list attribute value of the row multiplied by 2 or is an empty value if the list attribute value multiplied by 2 is smaller than the number N of data items.

11. The method of claim 2, wherein the value of the right child attribute of a given row is the list attribute value of the row multiplied by 2 plus 1 or is an empty value if the list attribute value multiplied by 2 plus 1 is smaller than the number N of data items.

12. The method of claim 1 further comprising storing the data table in a main memory of the client computer.

13. A computer program product comprising computer executable instructions to perform the method as claimed in claim 1.

14. A client system for providing a tree data structure from bulk data comprising data items, wherein an algorithm adapted for resorting sorted data items in accordance with levels and the ordering of the nodes within each level of a tree data structure is provided, each data item corresponding to a node of the tree data structure, the client system being configured for:

receiving at a client computer the data items to be stored on the tree data structure;

sorting the received data items in accordance with a predefined sorting order;

processing at the client computer the algorithm for resorting the sorted received data items;

generating a data table for representing the tree data structure in a tabular form having columns and rows, wherein in accordance with the resorting order each row of the data table represents a respective resorted data item, wherein values in the columns are determined in accordance with the order of the rows, and wherein the columns represent attributes, the attributes comprising for a given node a:

parent attribute indicating a parent node of the given node;

right child attribute indicating a right child node of the given node;

left child attribute indicating a left child node of the given node;

height attribute indicating a height of the given node in the tree data structure;

data attribute item indicating the data items;

list attribute indicating the resorting order of each row of the data table;

generating the data table comprising iteratively creating the rows of the data table comprising:

selecting an item of the resorted data items in the resorting order;

determining values of the attributes for the selected item, and storing the values in the row of the data table corresponding to the selected data item;

storing the data table as the tree data structure on the client computer, connecting the client computer to a server computer and sending the data table to the server computer via the connection for performing storing the data table on the server computer as the tree data structure.

* * * * *